H. M. MORRILL.
GARDEN TOOL.
APPLICATION FILED AUG. 1, 1908.
937,219.
Patented Oct. 19, 1909.
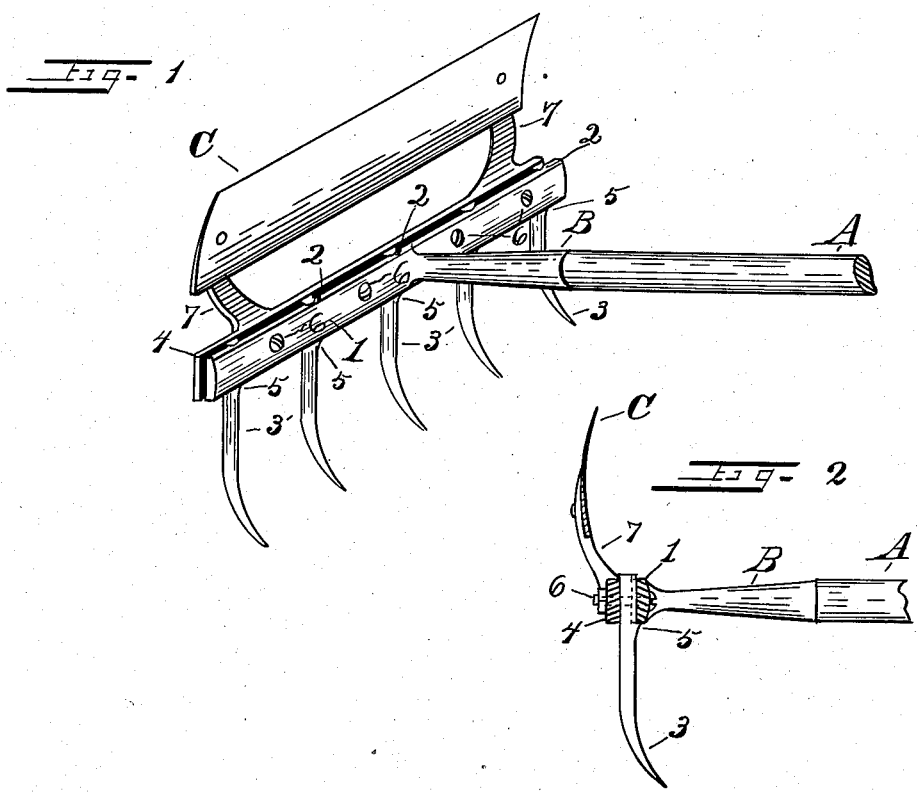
Witnesses.
J. L. Randall,
R. W. Nordman
Inventor.
Henry M. Morrill.
By Victor E. Randall
Atty.

UNITED STATES PATENT OFFICE.

HENRY M. MORRILL, OF TEKONSHA, MICHIGAN.

GARDEN-TOOL.

937,219.

Specification of Letters Patent.

Patented Oct. 19, 1909.

Application filed August 1, 1908. Serial No. 446,466.

*To all whom it may concern:*

Be it known that I, HENRY M. MORRILL, a citizen of the United States, residing at Tekonsha, in the county of Calhoun and State of Michigan, have invented certain new and useful Improvements in Garden-Tools, of which the following is a specification.

This invention relates to garden tools, and more particularly to that class of tools in which a rake and hoe portion are oppositely secured to a head, to which a handle is affixed.

Among other objects, I provide a tool of this character in which the teeth may be readily removed for the purpose of duplicating in case of breakage, or for changing the style of tooth as the operator may elect.

Other objects and advantages will hereinafter appear in the specification and be more particularly set forth in the claim hereto appended and forming a part thereof.

In the drawings forming a part of this specification, Figure 1 is a perspective view of my improved garden tool. Fig. 2 is a vertical cross-section on a line intersecting a tooth fastening.

In the drawings like marks of reference refer to corresponding parts throughout the different views, in which—

A, represents a handle; B, the tool shank or handle socket; and C, a blade adapted to be used as a hoe or scuffer.

Secured to, or forming a part of, the shank or socket, B, a transverse T-head, 1, is provided. This head, on the side opposite the handle socket or shank is provided with vertically-disposed notches, 2, within which teeth, 3, are fitted. To the rear and lying parallel with the tool-head 1, a secondary or clamping plate, 4, is provided between which the teeth are held in position. To prevent the teeth from upward thrust or longitudinal displacement, each tooth is formed with an offset or shoulder, 5, which is adapted to abut the under side of the tool-head, 1, and to prevent the teeth from rolling or turning edgewise in the tool-head the rear of the teeth are slightly flattened and firmly secured by means of screws or bolts, 6, which pass through parts 1 and 4, clamping the parts together. The clamping plate, 4, by preference has two upwardly-formed arms, 7, to which a blade, C, is secured by riveting or otherwise, the blade answering the purpose of a scuffer or hoe.

Having, therefore, set forth my invention, what I claim as new and desire to secure by Letters Patent, is:—

In a garden tool, the combination with a handle socket provided with an integral T-head having notches formed in its outer faces, of a clamping plate substantially the same size as the T-head connected thereto by bolts passing transversely through the respective members, said clamping plate being provided with upwardly and forwardly projecting curved arms provided with apertured ends, a curved blade secured to said arms by rivets passing through the same and teeth arranged within the notches of the T-head having flattened sides adapted to be engaged by the clamping plate, said teeth being provided with shoulders for engaging the lower edge of the T-head for limiting the upward movement of the same.

HENRY M. MORRILL.

Witnesses:
B. G. DOOLITTLE,
C. A. BRIMMER.